United States Patent [19]

Dronet

[11] 4,452,580

[45] Jun. 5, 1984

[54] DEEP DRAWING MACHINE FOR MANUFACTURING RECEPTACLES MADE OUT OF THERMOPLASTIC FOIL MATERIAL

[75] Inventor: Jean M. Dronet, Falaise, France

[73] Assignee: Ste d'Application Plastique, Mecanique et Electroniqueet Plastimecanique S.A., Flaiase, France

[21] Appl. No.: 446,731

[22] Filed: Jun. 7, 1982

[51] Int. Cl.$^3$ ............................................. B29C 17/00
[52] U.S. Cl. ................................. 425/305.1; 425/388; 425/397; 425/405 R; 425/503; 425/510; 425/122
[58] Field of Search ..................... 425/387.1, 388, 394, 425/397, 305.1, 503, 504, 510, 110, 112, 122, 308, 405 R; 264/516

[56] References Cited

U.S. PATENT DOCUMENTS

| | | | |
|---|---|---|---|
| 3,661,489 | 5/1972 | Moore | 425/388 X |
| 3,709,643 | 1/1973 | Nasica | 425/308 X |
| 3,827,128 | 8/1974 | Nasica | 264/516 X |
| 4,021,286 | 5/1977 | Amberg | 425/388 X |
| 4,059,377 | 11/1977 | Corbic | 425/305.1 |
| 4,086,045 | 4/1978 | Thiel et al. | 425/388 X |
| 4,150,936 | 4/1979 | Shioi et al. | 425/388 X |
| 4,242,293 | 12/1980 | Dowd | 425/305.1 X |
| 4,335,635 | 6/1982 | Hautemont | 425/122 X |
| 4,370,118 | 1/1983 | Dronet | 425/305.1 |
| 4,394,115 | 7/1983 | Dronet | 425/122 |

Primary Examiner—J. Howard Flint, Jr.

[57] ABSTRACT

Deep-drawing machine for manufacturing containers out of thermoplastic foil material having an arrangement for inserting into the hollow mold prior to the deep drawing step a banderole-shaped strip section. The machine includes support means for a roll of foil material, means for transporting the foil material, a heating arrangement as well as a forming arrangement and said forming arrangement consists of a stationary counter mold and the hollow mold movable perpendicular to the foil plane, which is pressed against a counter mold after the heating of the foil. After the container is formed by means of a pressure medium, the strip sections, which have been introduced into the hollow mold, are sealed onto the container. The arrangement for inserting the banderole-shaped strip sections into the hollow mold includes a winding mandrel which is stationary with respect to the axially movable hollow mold. In the outer peripheral surface of which winding mandrel there are disposed a plurality of bores which are adapted to be placed in communication with a vacuum source and there is arranged exteriorly of the hollow mold at the inlet side of the banderole-shaped strip sections a slider which is glidably mounted relative to the hollow mold and the winding mandrel. The slider includes a recess, the height of which corresponds to the width of the banderole-shaped strip sections.

16 Claims, 8 Drawing Figures

DEEP DRAWING MACHINE FOR MANUFACTURING RECEPTACLES MADE OUT OF THERMOPLASTIC FOIL MATERIAL

This application is related to applicant's U.S. applications Ser. No. 250,595, filed Apr. 3, 1981, now U.S. Pat. No. 4,394,115, and Ser. No. 265,101, filed May 10, 1981, now U.S. Pat. No. 4,370,118.

The invention relates to a deep-drawing machine for manufacturing containers or receptacles made out of thermoplastic foil material which includes an arrangement for introducing sections of banderole-shaped strips into hollow molds prior to a deep drawing step.

A deep-drawing machine of this type permits an economic and hygienic packaging of substances in liquid or pasty form, for example, medications or food stuffs. For this purpose, the deep-drawing machine includes means for manufacturing a container, means for filling the container, and means for sealing it. Furthermore, there are means provided to affix onto the container, for example, decorative material, by means of a banderole-like strip which is connected to the exterior wall of the container and is permanently bonded to it by means of being sealed thereon.

A deep-drawing machine of this type is, for example, disclosed in German published patent application No. 23 65 028. In this known deep-drawing machine, the arrangement for inserting the banderole-like strip sections into the hollow mold encompasses a slidably axially movable winding mandrel which serves to act on the banderole-like strip sections. The winding mandrel projects in a first position completely into the hollow mold, whereas in its other second position its front end forms the bottom of the mold during the forming process.

In particular, with a rotatable winding mandrel with a circular surface and a container shape which departs from the conventional cylindrical shape (such container shape can, for example, have an elliptical cross-sectional surface in the edge vicinity) there arise certain problems with introducing the banderoles. Such problems exhibit themselves, for example, when overlapping end portions of the banderole during the deep-drawing of the containers are displaced in a direction towards the bottom of the mold and thereby no longer remain at the same height as the initial portion of the banderole. Such a banderoled container is, however, used as scrap.

It is an object of this invention to improve known deep-drawing machines of the aforedescribed type in such a way that the aforedescribed problems are avoided and a flaw-free banderoling is achieved.

The deep-drawing machine of the invention for manufacturing containers out of thermoplastic foil material has an arrangement for inserting into a hollow mold prior to the deep drawing step a banderole-shaped strip section. The machine includes support means for a roll of foil material, means for transporting the foil material, and a heating arrangement as well as a forming arrangement. Said forming arrangement consists of a stationary counter mold and the hollow mold movable perpendicular to the foil plane, which is pressed against a counter mold after the heating pressure medium and thereby simultaneously the strip sections, which have been introduced into the hollow mold, are sealed onto the container. The arrangement for inserting the banderole-shaped strip sections into the hollow mold includes a winding mandrel which is stationary with respect to the axially movable hollow mold, in the outer peripheral surface of which winding mandrel there are disposed a plurality of bores which are adapted to be placed in communication with a vacuum source. There is arranged exteriorly of the hollow mold at the inlet side of the banderole-shaped strip sections a slider which is glidably mounted relative to the hollow mold and the winding mandrel. The slider includes a recess, the height of which corresponds to the width of the banderole-shaped strip sections.

The invention is hereinafter further described in conjunction with the drawing, in which.

The principle of manufacturing of containers having banderole-shaped strips in a deep-drawing machine is already known. It consists in that the banderole-shaped strip, which can serve for decorative or reinforcement purposes, is inserted in a hollow mold, a thermoplastic preheated foil is placed over the open side of the hollow mold, and with the aid of a punch the thermoplastic foil is shaped while being introduced into the hollow mold and thereby is shaped into a container and for the final shaping the container receives the necessary shape by means of a pressure medium which acts on the punch side on the preshaped container and presses its walls against the inner surface of the hollow mold. Thereby the foil of the container is fixedly joined to the banderole-shaped strip which has been previously introduced into the hollow mold.

In order to make possible the insertion of the banderole-shaped strip into the hollow mold there is provided in the known deep-drawing machines a rotatable winding mandrel which brings the banderole-shaped strip into a shape which is adapted to that of the container and then transfers the strip into the hollow mold.

Figure 1:
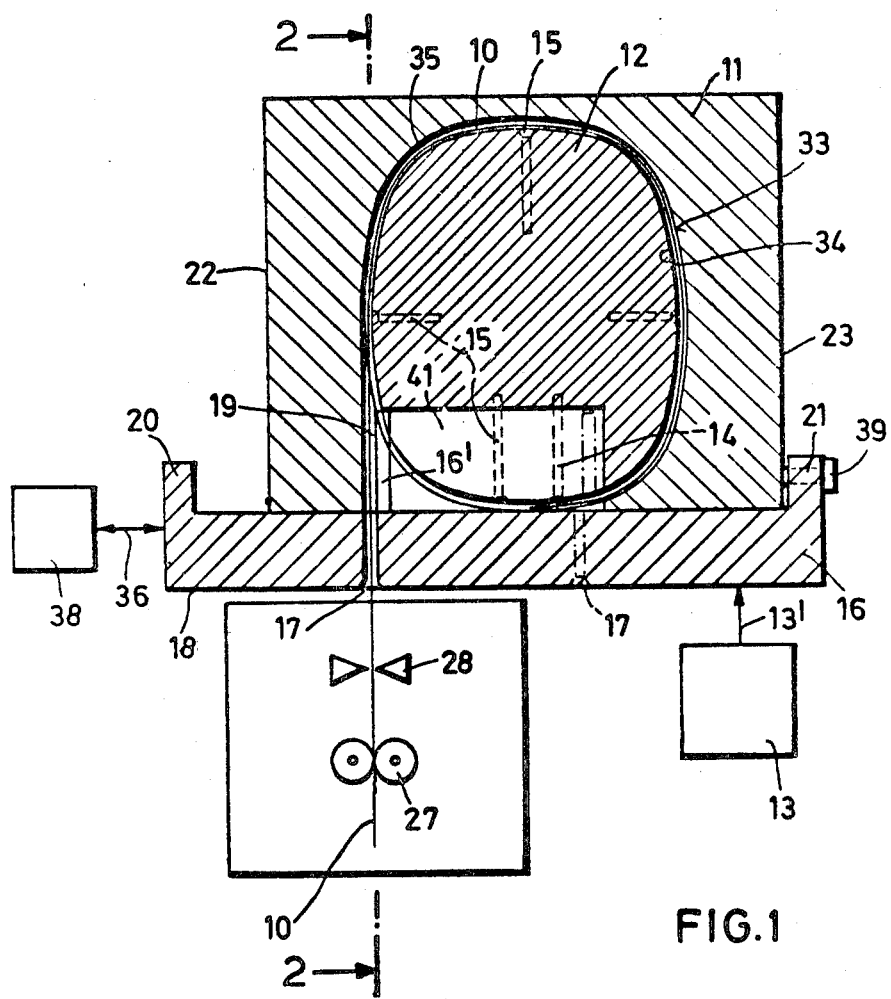
FIG. 1 is a schematic cross-sectional view in the region of the hollow molds of the deep-drawing machine in which all parts of the arrangement, which are not immediately related to the invention, have been omitted, which cross-sectional view is taken along the line 1—1 of FIG. 2.

The arrangement of the present invention departs from the aforedescribed conventional arrangement in that a non-rotatable winding mandrel 12 is provided (see FIG. 1), which is fixedly arranged relative to the axially movable hollow mold 11. Outside of the hollow mold 11 there is mounted at the bottom inlet side of the banderole-shaped strip sections 10 a slider 16 which is glidably mounted relative to the hollow mold 11 and the winding mandrel 12 (see FIGS. 3 to 5). This slider 16 has a plurality of inlet slots or recesses 17 the height of which correspond to the width of the banderole-shaped strips 10. In order to facilitate the introduction of the banderole-shaped strips 10 into the recesses 17, the recess is advantageously widened by a funnel-shape at the bottom side confronting the exterior surface 18 of the slider 16 which faces away from the hollow mold 11.

The glidable movement of the slider 16 is effected perpendicular to the plane of the banderole-shaped strip 10 and in a plane which is parallel to the non-illustrated path traversed by the foil and from which the containers are manufactured.

The glidably mounted sliders 16 are reciprocable between essentially two operative positions, whereby in the first operative position of the slider 16 the recess 17 is in alignment with the inlet channel 19 for the banderole-shaped strip sections 10 in the hollow mold 11 (FIG. 1) and whereby in the second operative position of the slider 16 the recess 17 is disposed in alignment with the opening 15 in the exterior peripheral surface of the winding mandrel 12. In order to limit the respective operative positions of the slider 16, the latter has two stops 20, 21 projecting in the direction of the hollow mold 11, which serve to abut against the exterior surfaces 22, 23 of the hollow mold 11 and in this manner limit the further movement of the slider 16 from its respective operative position. At least one adjustable screw 39, mounted in the stop 21 where it can be adjusted and then fixed in position, serves to exactly adjust the working positions of the glidably mounted slider 16.

The inserting of the banderole-shaped strip 10 into the hollow mold 11 is carried out as follows:

The slider 16 is disposed in its first working position (FIG. 1), in which the recess 17 is in alignment with the inlet channel 19. This operative position of the slider 16 is limited by the stop 21, which abuts against the exterior surface 23 of the hollow mold 11. The hollow mold 11, which is movable relative to the fixed winding mandrel 12 in the axial direction, in its first working position surrounds the winding mandrel 12 coaxially in such a way that there is formed between the inner wall 33 of the hollow mold 11 and the exterior wall 34 of the winding mandrel 12 a guide channel 35 for the banderole-shaped strips 10.

Figure 2:
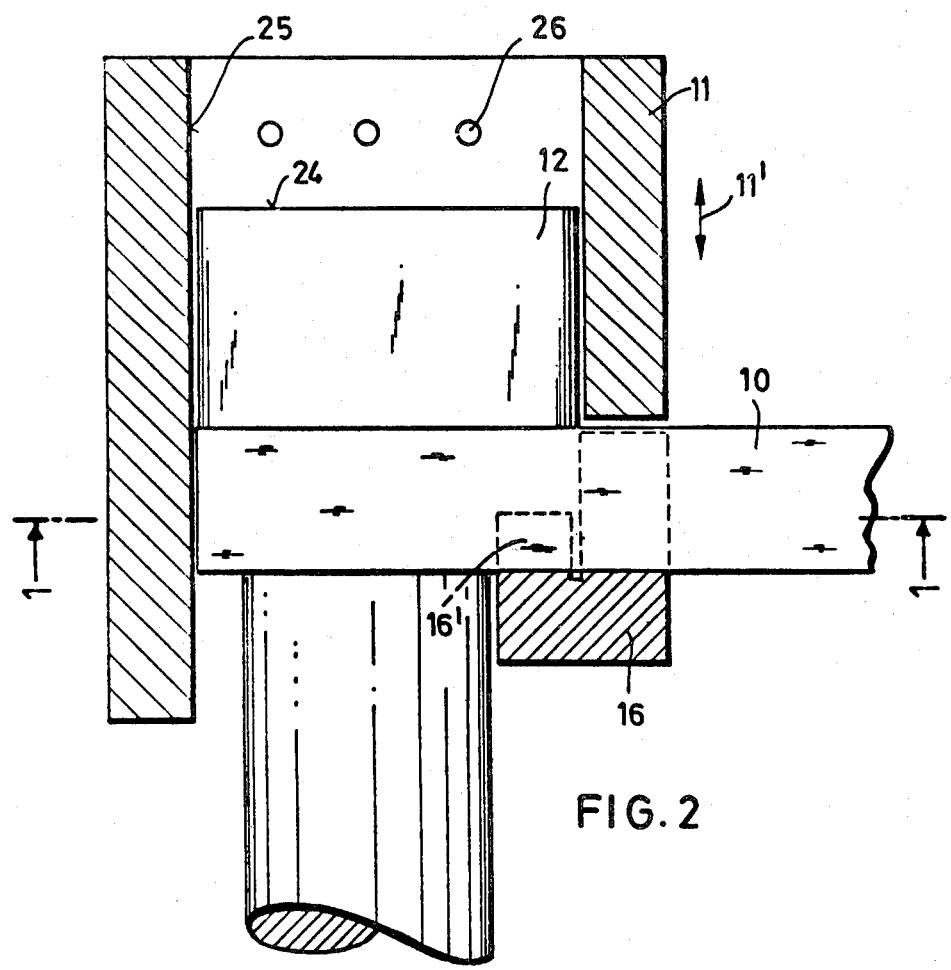
FIG. 2 is a longitudinal sectional view taken along line 2—2 of FIG. 1.
Figure 3:
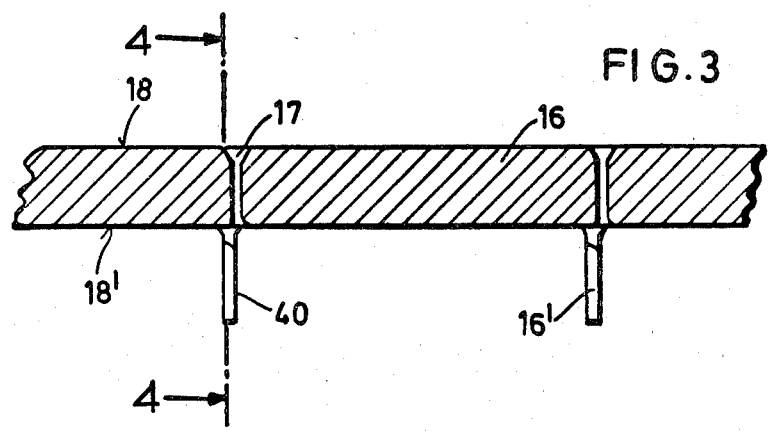
FIG. 3 is a plan view of the upper side of the glidably mounted slider.
Figure 4:
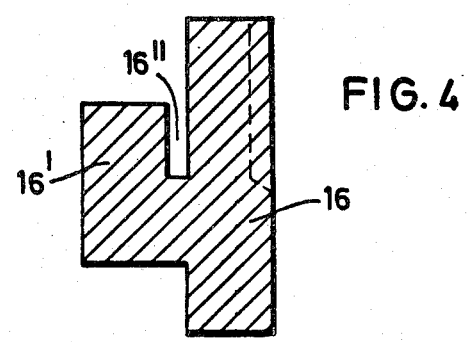
FIG. 4 is a cross-sectional view of the glidably mounted slider taken along line 4—4 of FIG. 3.
Figure 5:
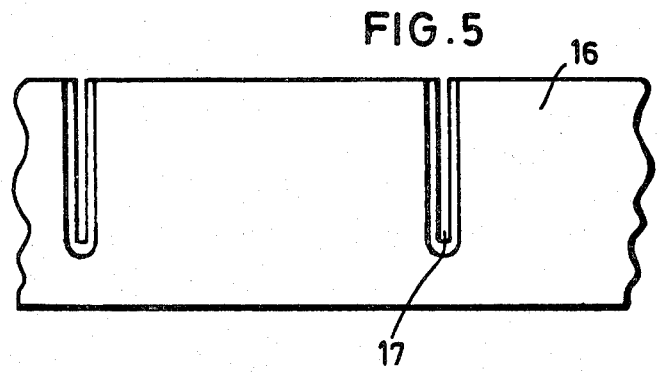
FIG. 5 is a partial view of the glidably mounted slider viewed in the direction in which the banderole-shaped strip section is introduced.

The banderole-shaped strips 10 are paid out from a non-illustrated supply roller and by suitable means, for example, bilaterally disposed drive rollers 27 acting on the strip 10, is preferably step-wise guided through the recess 17 and the inlet channel 19 in such a way into the guide channel 35 that it abuts against the exterior curved surface 34 of the winding mandrel 12. In order to facilitate the introduction of the banderole-shaped strips 10, the glidably mounted slider 16 has a nose-shaped projection 16' which projects normally from the exterior surface 18' of the slider 16 facing the winding mandrel 12 (FIGS. 2, 3 and 4). The banderole-shaped strip 10, which is introduced into the recess 17 is slidingly guided along the exterior surface 40 of the projection 16' (FIG. 3). The winding mandrel 12 has at its disposal a cut-out 41 at the level and depth of the projection 16' (FIG. 1) for the purpose of not hindering the movement of the slider 16 between its different operative positions. The forward end of the strip 10 reaches thereby the region of the exterior glide surface 34 of the winding mandrel 12 wherein a bore 14 is arranged which is in communication via a conduit 13' with a vacuum source 13, and as a result of such connection of the bore 14 with the vacuum source 13, the strip 10 is held against the exterior surface 34 of the winding mandrel 12.

By means of a cutting arrangement 28, the banderole-shaped strip 10 is thereafter cut at a predetermined length, which in general has a maximum length corresponding to the exterior periphery of the to-be-banderoled container.

Departing from the arrangements of the prior art, no overlapping of the strip 10 is necessary, so that in an advantageous manner, a displacement of the overlapping end pieces of the strip during the deep-drawing process cannot occur.

The arrangement of the invention also makes it possible in an advantageous manner to work with shorter strip sections, the length of which may be less than the exterior periphery of the container, for example, when only portions of the exterior periphery of the container are to be provided with a banderole-shaped strip 10.

The glidably mounted slider 16 is thereafter moved to the right (FIG. 1) into its second operative position which is limited by means of the engagement of stop 20 with the exterior surface 22 of mold 11. The further movement of the slider 16 is illustrated by means of the arrow 36. During the further movement of the slider 16, the rear end portion of the banderole-shaped strip 10, which is still disposed within the recess 17 of the slider 16, is moved by means of the slider 16 in a direction onto the exterior peripheral surface 34 of the winding mandrel 12 and thereby arrives at the region of the opening 15 for abutment. These openings 15, as is the case with the opening 14, are in communication with a vacuum source 13 via the conduit 13'. When the opening 15 is placed in communication with the vacuum source, the rear end piece of the banderole-shaped strip 10, which has been moved by the slider 16, is held against the winding mandrel 12. In order not to hinder the foward end piece, which is disposed in the region of the opening 14 against the winding mandrel, the projection 16' has a slot 16" (see FIG. 4).

In a first working step the hollow mold 11, which is movable in the axial direction, moves so far relative to the stationary winding mandrel, that the openings 26 are disposed on the inner wall surface 25 of the hollow mold 11 at the level of the banderole-shaped strips 10 wound on the winding mandrel 12. Also the openings 26 are in communication with the vacuum source 13 at predetermined periods of time. First of all, the communication of the openings 14, 15 with the vacuum source 13 is interrupted, as a result of which the strips 10 are released from the exterior peripheral surface 34 of the winding mandrel 12 and, due to the inherent elastic tension, bears against the inner wall surface 25 of the hollow mold 11 in the region of the bores 26. Thereafter, the openings 26 are placed in communication with the vacuum source, whereby the strip 10 is firmly held against the inner wall of the hollow mold 11. In a further working step, the hollow mold 11 then moves jointly upwardly with the thereto-adhering strip 10 so far relative to the stationary winding mandrel 12 that its upper base surface 24 forms the bottom of the hollow mold 11. Thereafter, in a known manner, there is effected, as has been previously herein described, a container by means of a deep-drawing process with the aid of the hollow mold 11, said container being made out of a thermoplastic foil material. Thereby the banderole-shaped strip 10, which adheres to the exterior wall of the container and annularly surrounds it, is permanently sealed to the wall of said container.

In the meantime, the glidably mounted slider 16 has returned to its first operative position (FIG. 1) so that with the introduction of a new banderole section into the inlet opening of the recess 17 a new sequence of the aforedescribed operative steps can be initiated.

For the further movement of the glidably mounted slider 16 into its operative position along the direction of the arrow 36 there is provided a drive mechanism 38. This drive mechanism is preferably a linear drive mechanism which has a reciprocating piston acting in the operative directions which is actuated by a pressure medium, such as, for example, pressurized air.

Figure 7:
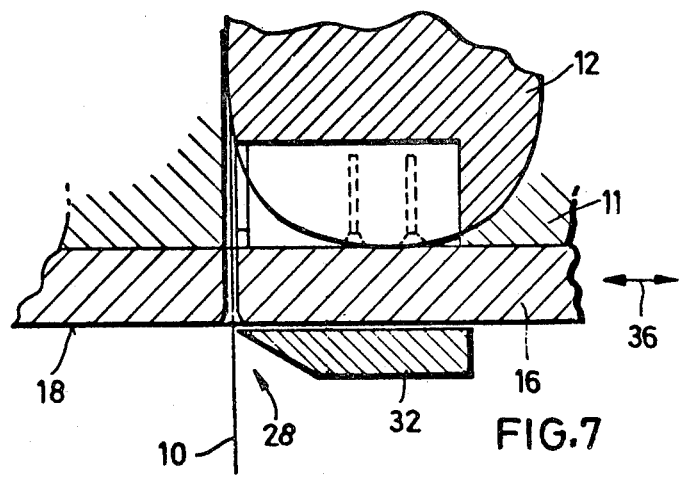
FIG. 7 illustrates a further embodiment of a cutting arrangement for cutting the banderole-shaped strip sections.
Figure 6:
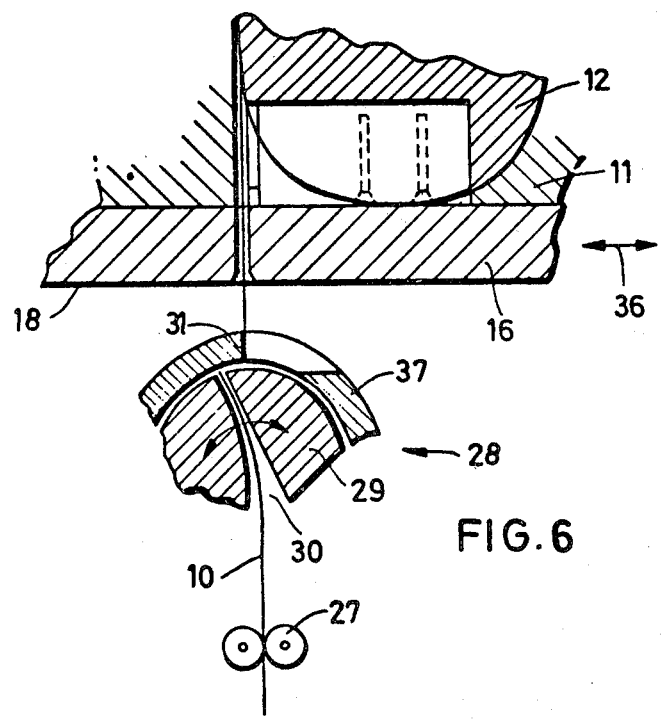
FIG. 6 illustrates a first embodiment of a cutting arrangement for cutting the banderole-shaped strip sections.

With reference to FIGS. 6 and 7 there are illustrated advantageous embodiments of the cutting arrangement 28 for precutting the banderole-shaped strips 10 at a predetermined length. The embodiment of FIG. 6 includes a first stationary member 37 having a cutting edge 31 in which a further second part 29 is rotatably mounted about an axis disposed in the plane of the strip 10, which part 29 has a centrally arranged guide slit 30 which is adapted for guiding the strip 10 therethrough. At a rotational movement of the rotatable part 39 the banderole-shaped strip 10 is cut at the cutting edge 31.

A particularly advantageous embodiment of a cutting arrangement 28 is schematically illustrated in FIG. 7. Such arrangement includes a knife 32, which is arranged parallel to the outer surface of the slider and stationary relative to its movement and thereby during the further movement of the slider 16 into its second operative position the banderole-shaped strips are cut in the region of the funnel-shaped mouth of the recess 17. This embodiment distinguishes itself by having only a few parts which makes is particularly secure to operate.

Figure 8:
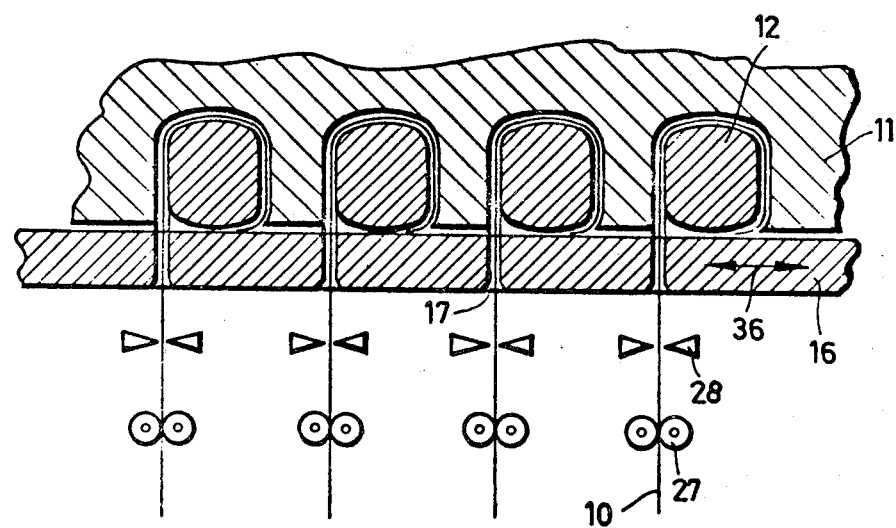
FIG. 8 is a cross-sectional view of a plurality of hollow molds arranged side-by-side in the cutting plane 1—1 according to FIG. 2.

It is possible without any particular degree of difficulty, as is schematically illustrated in FIG. 8, to introduce in accordance with the arrangement of the invention banderole-shaped strips 10 into a plurality of hollow molds 11. In such arrangement, for example, a row of a plurality of hollow molds 11 are arranged side-by-side. For this purpose, the slider 16 has a number of hollow molds 11 and a corresponding number of recesses 17 and projections 16' through which the banderole-shaped strips are guided.

Although the invention is illustrated and described with reference to a plurality of embodiments thereof, it is to be expressly understood that it is in no way limited to the disclosure of such preferred embodiments but is capable of numerous modifications within the scope of the appended claims.

I claim:

1. In a deep-drawing machine for manufacturing containers out of thermoplastic foil material having an arrangement for inserting into the hollow mold prior to the deep drawing step a banderole-shaped strip section, whereby the machine includes support means for a roll of foil material, means for transporting the foil material, and a heating arrangement as well as a forming arrangement, said forming arrangement including a stationary counter mold and the hollow mold which is movable perpendicular to the plane of the foil, which is pressed against a counter mold after the heating of the foil, whereafter the container is formed by means of a pressure medium and thereby simultaneously the strip sections, which have been introduced into the hollow mold, are sealed onto the container, the improvement wherein the arrangement for inserting the banderole-shaped strip sections into the hollow mold includes a winding mandrel which is stationary with respect to the axially movable hollow mold, in the outer peripheral surface of which winding mandrel there are disposed a plurality of bores which are adapted to be placed in communication with a vacuum source, and there is arranged exteriorly of the hollow mold at the inlet side of the banderole-shaped strip sections a slider which is glidably mounted relative to the hollow mold and the winding mandrel, which slider includes a recess, the height of which corresponds to the width of the banderole-shaped strip sections.

2. A deep-drawing machine according to claim 1, wherein the recess is funnel-widened in order to facilitate the introduction of the banderole-shaped strip sections into the recess at the exterior surface of the slider which faces away from the hollow mold.

3. A deep-drawing machine according to claim 2, wherein the glidably mounted slider has a nose-shaped projection which projects perpendicularly relative to the winding mandrel.

4. A deep-drawing machine according to claim 3, wherein the projection is disposed immediately adjacent to the recesses in such a way that the side surface of the projection serves as a guide means for the banderole-shaped strip section.

5. A deep-drawing machine according to claim 4, wherein the winding mandrel has a cut-out, the dimensions of which in height and depth correspond to the projection.

6. A deep-drawing machine according to claim 5, wherein the projection includes a recess in order not to hinder the transfer of the slider into its second operative position wherein the forward end piece of the banderole-shaped strip abuts against the winding mandrel in the region of the opening.

7. A deep-drawing machine according to claim 6, wherein the glidably mounted slider is reciprocably movable essentially between two operative positions, whereby in the first operative position the recess of the slider is in alignment with the inlet channel for the banderole-shaped strip section in the hollow mold, and whereby in the second operative position the recess of the slider is about of the level of the opening in the exterior peripheral surface of the winding mandrel.

8. A deep-drawing machine according to claim 7, wherein the slider has two stops projecting in the direction of the hollow mold which are adapted to abut against the exterior surfaces of the hollow mold and which limit the reciprocable movement of the slider in its corresponding two possible operative positions.

9. A deep-drawing machine according to claim 8, wherein the exact adjustment of the prevailing operative position of the slider is achieved by at least one adjusting screw which is rotatably mounted in the stop of the slider and can be fixedly mounted therein.

10. A deep-drawing machine according to claim 9, wherein the hollow mold is slidably axially movable between at least two operative positions relative to the stationary winding mandrel, whereby in the first operative position the base surface of the winding mandrel forms the bottom of the hollow mold, and whereby in the second operative position of the hollow mold there is disposed in the upper portion openings which are in communication with a vacuum source at the level of the winding mandrel, the rolled on banderole-shaped strip.

11. A deep-drawing machine according to claim 10, wherein means are provided, for example, bilaterally disposed driving rollers relative to the banderole-shaped strip, which preferably stepwise introduces the banderole-shaped strip into the hollow mold.

12. A deep-drawing machine according to claim 11, wherein a cutting arrangement is provided for cutting the banderole-shaped strips at a predetermined length.

13. A deep-drawing machine according to claim 12, wherein the cutting arrangement includes a rotatably arranged part having a centrally disposed guide slit for guiding therethrough the banderole-shaped strip as well as having a fixedly arranged cutting edge.

14. A deep-drawing machine according to claim 13, wherein for cutting the banderole-shaped strips at a predetermined length a cutting arrangement is provided which includes a knife which is fixedly arranged parallel to the exterior surface of the slider, and said knife during the further movement of the slider into its second operative position cuts the banderole-shaped strip in the region of the funnel-shaped mouth of the recess.

15. A deep-drawing machine according to claim 14, wherein for the reciprocation of the glidably mounted slider a drive mechanism is provided.

16. A deep-drawing machine according to claim 15, wherein the drive mechanism is a linear drive mechanism which includes a reciprocably movable piston which is actuated by a pressure fluid medium.

* * * * *